Jan. 27, 1953 — L. R. POTTER — 2,626,841
SELF-ALIGNING BEARING
Filed July 23, 1945
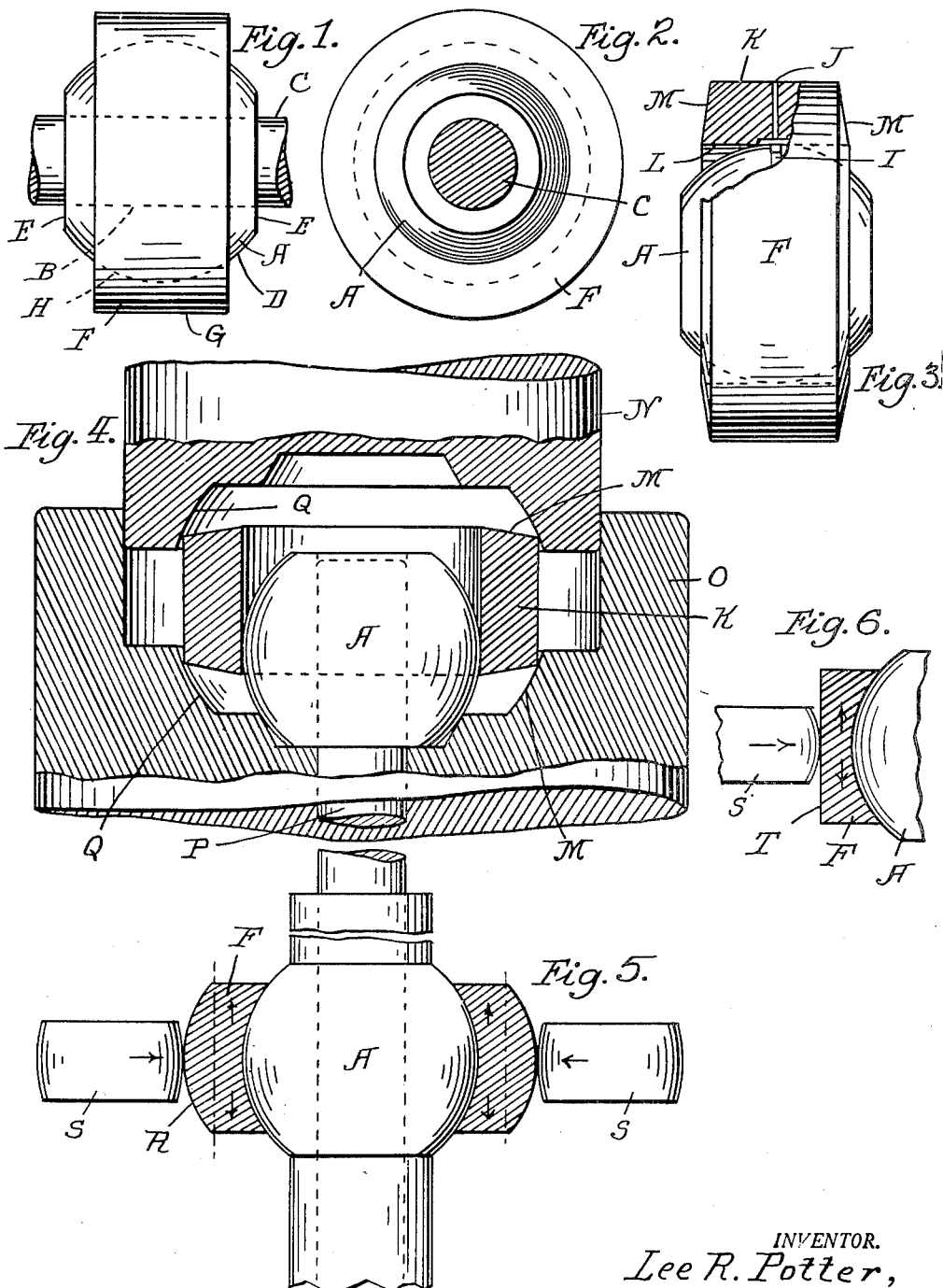
INVENTOR.
Lee R. Potter, Patented Jan. 27, 1953

2,626,841

UNITED STATES PATENT OFFICE 2,626,841

SELF-ALIGNING BEARING

Lee R. Potter, Long Beach, Calif., assignor to Southwest Products Co.

Application July 23, 1945, Serial No. 606,678

2 Claims. (Cl. 308—72)

This invention relates to the manufacture of self aligning bearings of that type which employs a spherical body in or upon which a shaft, pinion or other work transmitting element is held freely to prevent any undesirable lateral strain or binding tendency. Bearings of this general type are commonly employed for pivotally, revolubly or slidably supporting rods, shafts, pinions and other mechanical elements. The primary object of this invention is the production of a spherical self aligning bearing which is simple and inexpensive in construction and in which a ball element is freely journaled and securely held without lost motion, whereby the rod, shaft or other element is maintained in aligned position to provide free movement without binding.

This invention further relates to the improved method of producing a self aligning bearing as will be set forth by the following description. To this end the invention contemplates forming a bearing race over a bearing ball in closely and evenly engaged position, whereby the contact surfaces conform and produce a tight connection, following which operation the ball race is mechanically expanded in such manner as to produce sufficient bearing clearance and freedom without any undesirable looseness, whereby the spherical bearing ball and the bearing race are engaged without waste play but are free relatively to adjust or compensate themselves.

In order to illustrate the invention and to make more readily apparent the improved method and product, I have illustrated in the drawing a typical example of my improved self aligning bearing and the apparatus and manner by which it is manufactured.

In the drawing, Fig. 1 is a side elevation of my improved self aligning bearing; Fig. 2 is an end elevation of the structure shown in Fig. 1; Fig. 3 is a side elevation showing the bearing ball placed within the bearing race blank, previous to forming the latter, a portion of the bearing race being broken away to expose a portion of the ball; Fig. 4 is a plan partly in central longitudinal section showing the structure illustrated in Fig. 3 placed in suitable dies in position to form the bearing race over the bearing ball, with their bearing surfaces engaged tightly; Fig. 5 is a side elevational view partly broken away illustrating the manner in which pressure is applied to the periphery of the bearing race to elongate the latter so that the bearing ball and bearing race are relatively free to revolve one upon the other without lost motion and without waste clearance between their bearing surfaces, and Fig. 6 is a diagrammatic view of a detail.

My improved self aligning bearing which is shown self contained and complete in Figs. 1 and 2, comprises a spherical bearing ball A having an axial passage B to receive a bolt, pin or other fastening means such as C and which when desired may permit sliding or universal movement of member C according to the use to which the device is applied. This bearing ball is preferably spherical but may be of other shape and is made out of relatively hard material such as steel and is provided with a smoothly finished perimeter D of curved contour excepting end portions which as shown are omitted to produce a pair of oppositely disposed flats E which are coaxial with passage B. This bearing ball is mounted in a single piece annular bearing race F, which resembles a collar having an outer cylindrical surface G and an inner raceway H, which latter conforms closely with the spherical surface of the bearing ball. The longitudinal curvature of the bearing race extends inwardly towards the axis of the bearing ball at both longitudinal ends of the raceway whereby the bearing ball and bearing race are movably retained together, the contact surfaces between the two being free to permit relative universal rotary movement.

The bearing race is preferably made out of ductile material such as brass or other metal which can be readily formed by pressing or swaging and later elongated. The bearing surfaces between the bearing ball and bearing race are close fitting with very little tolerance between, whereby substantially no lost motion is permitted between the journal members. The bearing thus produced is self aligning and is adapted for use in machine practice where true alignment of bearings without binding or lost motion is desired. The bearing is self contained, that is it is of unitary form and is composed of the ball member and the raceway, the latter being of single piece construction, whereby the bearing ball may not be removed without destroying the usefulness of the race. Friction and wear between the bearing surfaces is reduced to a minimum, when desired by the application of lubricating medium to an annular channel I (Fig. 3), in the spherical surface of the ball and a feed duct J through the wall of the bearing race.

In the manufacture of my improved self aligning bearing, the bearing ball A of relatively hard metal or other suitable material as shown in the drawing is first produced. The bearing race is formed from a cylindrical blank K, of ductile metal or other suitable material as shown in Fig. 3, having an inner cylindrical bore L, the latter corresponding substantially in diameter with the diameter of the bearing ball. The outside diameter of the blank is of any suitable excessive size to provide the necessary material for forming the finished ball race and the opposite ends M are evenly tapered diametrally outwardly so that at the finish of the forming operation to follow, the material is expanded axially by pressure diametrally inwardly and the ends M assume relatively parallel or normal position as shown in Fig. 1, as will be hereinafter described.

The bearing race blank K and the bearing ball shown in Fig. 3 are next placed in assembled position between the male and female dies N and O as shown in Fig. 4, the bearing ball being slipped over and retained in longitudinal position between the dies by the pilot pin P. When the die members are closed together under pressure the blank K is formed with the cylindrical surface L of its bore conforming with and tightly engaging the perimeter of the bearing ball both longitudinally and laterally and the sides or ends M of the bearing race assume a position outwardly at right angles or normal to the longitudinal axis of the bearing ball and bearing race and parallel to each other, all as shown in Fig. 5. The male and female dies are shaped and constructed to produce the above effect. In these dies the corresponding inwardly curved shoulders Q compress the blank into the cross sectional shape shown in Fig. 5, leaving an annular crown R of excessive material which is later utilized as will be hereinafter described.

The result of forming the blank K as described, causes the ball and bearing race to tightly and immovably engage and prevent rotative movement therebetween. To release this tightness the assembled parts are removed from between the die members and the crown R of the bearing race is subjected to sufficient contractive pressure by rolling contact of one or more pressure rolls such as S, shown in Fig. 5, by which sufficient force is applied diametrally inwardly to expand and elongate the bearing race towards both of its ends as indicated by the arrows in Fig. 5 to relatively release the bearing ball and bearing race and provide free rotative contact without waste clearance or lost motion.

After freeing the joint between the bearing ball and bearing race as described, the remaining waste crown material is trimmed from the bearing race to produce the desired exterior shape such as indicated by the broken lines in Fig. 5 and by the cylindrical surface F shown in the finished self aligning bearing in Fig. 1.

A similar expanding or elonging effect can be produced upon the bearing race as indicated diagrammatically by the arrows shown in Fig. 6, when the crown R is not present and the contracting pressure is applied by the rollers S against the cylindrical outer surface T of the ball race. Thus the body of the bearing race can be elongated before or after the trimming operation with substantially equal effectiveness. It is also contemplated that other means may be employed for elongating the bearing race to release the bearing ball so that it will rotate freely, within the spirit of the invention.

In accordance with the patent statutes, I have described the principles of operation of my invention, together with the means by which my improved process is carried into practice, but I desire to have it understood that the process and means for producing same may be variously modified within the spirit of the invention and within the scope of the following claims.

I claim:

1. A self-aligning bearing construction involving inner and outer bearing members, said inner bearing member comprising a bearing ball having a spherical bearing surface and an axially disposed bore for receiving a shaft, a non-ferrous malleable metal single piece outer bearing race member having a spherical socket corresponding in shape to the spherical inner bearing member and having parallel radial end walls, said outer race member being stressed such that the metal adjacent the inner peripheral surface area is compressed and the metal adjacent the outer peripheral surface is under a stress tension to form an unstretchable peripheral area which, when subjected to a rolling pressure, will cause the metal adjacent the inner peripheral surface to expand the ends of said outer bearing member in a direction away from the axis of the self-aligning bearing.

2. A self aligning bearing construction involving inner and outer bearing members, said inner bearing member comprising a bearing ball having a spherical bearing surface, a malleable single piece outer bearing race member having a spherical socket corresponding in shape to the spherical inner bearing member, said outer race member being stressed such that the metal adjacent the inner peripheral surface area is compressed and the metal adjacent the outer peripheral surface is tensioned.

LEE R. POTTER.

REFERENCES CITED

The following references are of record in the file of this patent:

UNITED STATES PATENTS

| Number | Name | Date |
| --- | --- | --- |
| 1,031,982 | Caswell | July 9, 1912 |
| 1,050,422 | Birchwood | Jan. 14, 1913 |
| 1,266,061 | Scoville | May 14, 1918 |
| 1,664,189 | Claus | Mar. 27, 1928 |
| 2,380,150 | Collito | July 10, 1945 |
| 2,382,773 | Chambers et al. | Aug. 14, 1945 |
| 2,476,728 | Heim | July 19, 1949 |